UNITED STATES PATENT OFFICE.

WILLIAM E. TAYLOR, OF EASTPORT, MAINE, ASSIGNOR TO AMERICAN CAN COMPANY, OF NEW YORK, N. Y., A CORPORATION OF NEW JERSEY.

PROCESS OF PACKING SARDINES.

1,016,046.  Specification of Letters Patent.  Patented Jan. 30, 1912.

No Drawing.  Application filed October 4, 1911. Serial No. 652,760.

*To all whom it may concern:*

Be it known that I, WILLIAM E. TAYLOR, a citizen of the United States, residing in Eastport, in the county of Washington and State of Maine, have invented a new and useful Improvement in Processes of Packing Sardines, of which the following is a specification.

This invention relates to an improvement in the art of preserving sardines and it consists in the process hereinafter more particularly explained and claimed.

In practicing my improved process, I take the freshly caught fish and pickle them in strong salt brine for about an hour and one-half, which is the usual procedure. The pickled fish are then placed in a close chamber into which live steam is turned directly among the fish which are spread out upon suitable racks in the ordinary manner. The fish are steamed until the flesh breaks away readily from the bone. After such steaming the fish are placed in a draft of air and thoroughly dried until they become stiff and hard. The fish thus dried are now placed in the open cans which are filled up with oil surrounding the fish.

The open cans containing the fish and oil are now placed in an oven where they are subjected to a heat exceeding 212° Fahrenheit. I prefer a temperature of about 220° or 225°, though this may be considerably exceeded, if it is desired to tinge or darken the oil. These cans filled with the sardines and the oil are left in the oven under the temperature stated for about one hour and one-half or two hours, by which they are thoroughly heated through and have acquired an improved flavor. A cover is now applied to the can while the same is still hot and hermetically sealed by a well known means.

The sardines so sealed will keep indefinitely; will have a fine flavor; the bones will be soft; and the interior of the can when cold will be firm and not swelled. This method of putting up sardines by subjecting them to dry oven heat and thus killing all germs before sealing, obviates the necessity of subjecting the sealed cans to the process bath after sealing, and leaves the product in better shape.

Having thus described the invention, I claim:

1. The process of preserving fish consisting in pickling, steaming and drying the fish, then placing the fish together with oil in open cans and subjecting the same to an oven heat and covering and sealing the cans while still hot, substantially as specified.

2. The process of preserving fish consisting in pickling, steaming and drying the fish, then placing the fish together with oil in open cans and subjecting the same to an oven heat of not less than 220° Fahrenheit for a long enough period to kill the germs, and sealing the cans while still hot.

WILLIAM E. TAYLOR.

Witnesses:
E. E. NEWCOMB,
JOHN L. PARKER.